(12) United States Patent
Schwartz et al.

(10) Patent No.: US 11,930,804 B2
(45) Date of Patent: Mar. 19, 2024

(54) AVIAN STREAMER DETERRENT FOR ELECTRIC POWER LINE SUPPORT STRUCTURES

(71) Applicant: Florida Power & Light Company, Juno Beach, FL (US)

(72) Inventors: Eric D. Schwartz, Palm Beach Gardens, FL (US); David C. Niebch, Port Saint Lucie, FL (US)

(73) Assignee: Florida Power & Light Company, Juno Beach, FL (US)

( * ) Notice: Subject to any disclaimer, the term of this patent is extended or adjusted under 35 U.S.C. 154(b) by 795 days.

(21) Appl. No.: 16/880,047

(22) Filed: May 21, 2020

(65) Prior Publication Data
US 2021/0360912 A1 Nov. 25, 2021

(51) Int. Cl.
*H02G 7/00* (2006.01)
*A01M 29/06* (2011.01)
(Continued)

(52) U.S. Cl.
CPC ............ *A01M 29/06* (2013.01); *A01M 29/32* (2013.01); *H02G 7/00* (2013.01); *H02G 7/205* (2013.01)

(58) Field of Classification Search
CPC ............ H02G 7/00; H02G 7/205; H02G 7/20; H02G 7/05; A01M 29/06; A01M 29/32; A01M 29/00; A01M 29/30
(Continued)

(56) References Cited

U.S. PATENT DOCUMENTS 2,938,244 A     5/1960  Christensen
4,234,753 A  *  11/1980  Clutter ..................... H02G 7/00
                                                        174/136
(Continued)

FOREIGN PATENT DOCUMENTS

CN      205429649          8/2016
CN      207504520  U       6/2018
(Continued)

OTHER PUBLICATIONS

Lyderson, Kari, Utilities seek to save birds from power lines (and vice versa), published in energynews.us, 4 pages Mar. 2014.
(Continued)

*Primary Examiner* — Angel R Estrada
(74) *Attorney, Agent, or Firm* — Fleit Intellectual Property Law; Thomas Grzesik

(57) ABSTRACT

An avian streamer deterrent system includes an electric power line support structure coupled to a plurality of conducting wires. Each conducting wire of the plurality of conducting wires is coupled to an insulator. At least one avian streamer deterrent is disposed above the insulator of at least one of the conducting wires of the plurality of conducting wires. The at least one avian streamer deterrent may be disposed on a that is absent an insulator and situated above the plurality of conducting wires. The at least one avian streamer deterrent or an additional avian streamer deterrent may extend over one or more jumpers coupling at least a first conducting wire of the plurality of conducting wires to a second conducting wire of the plurality of conducting wires. In addition, the at least one avian streamer deterrent may comprise a rotatable configuration or a collapsible configuration.

14 Claims, 16 Drawing Sheets

(51) Int. Cl.
  *A01M 29/32* (2011.01)
  *H02G 7/20* (2006.01)
(58) Field of Classification Search
  USPC ......... 174/45 R, 138 F, 172, 138 R, 136, 44,
        174/137 R, 142, 152 R, 156; 52/101
  See application file for complete search history.

(56) References Cited

U.S. PATENT DOCUMENTS

| | | | |
|---|---|---|---|
| 5,058,335 A | 10/1991 | Richter | |
| 5,293,721 A | 6/1994 | Richard et al. | |
| 5,497,585 A | 3/1996 | Engler | |
| 5,606,830 A | 3/1997 | Townsend et al. | |
| 5,755,179 A | 5/1998 | Webber | |
| 5,873,324 A | 2/1999 | Kaddas et al. | |
| 6,255,597 B1* | 7/2001 | Bowling | H01B 17/00 |
| | | | 174/138 F |
| 6,291,774 B1* | 9/2001 | Williams | H01B 17/00 |
| | | | 174/138 R |
| 6,367,419 B1 | 4/2002 | Gosselin | |
| 6,571,517 B2 | 6/2003 | Wulff et al. | |
| 6,730,852 B1* | 5/2004 | Puigcerver | H01B 17/58 |
| | | | 174/138 F |
| 6,812,400 B1 | 11/2004 | Lynch | |
| 6,963,025 B1* | 11/2005 | Kysely | H01B 17/00 |
| | | | 174/5 SB |
| 7,154,036 B2* | 12/2006 | Lynch | H02G 7/00 |
| | | | 174/138 F |
| 7,481,021 B2* | 1/2009 | Riddell | A01M 29/26 |
| | | | 43/1 |
| 7,538,277 B2 | 5/2009 | Spencer | |
| 7,839,256 B2* | 11/2010 | Bradford | H01B 17/00 |
| | | | 337/186 |
| 8,015,747 B2* | 9/2011 | Donoho | A01M 29/26 |
| | | | 340/573.2 |
| 8,096,176 B1 | 1/2012 | Mayers et al. | |
| 8,156,693 B2 | 4/2012 | Lynch | |
| 8,434,274 B2 | 5/2013 | Anderson | |
| 8,438,998 B2* | 5/2013 | Spencer | A01M 29/06 |
| | | | 52/101 |
| 8,617,613 B2 | 12/2013 | Wright et al. | |
| 8,869,467 B2 | 10/2014 | Donoho | |
| 8,957,314 B2* | 2/2015 | Niles | H02G 7/00 |
| | | | 174/172 |
| 9,554,570 B2 | 1/2017 | Adams | |
| 9,608,424 B2* | 3/2017 | Williams | H02G 7/00 |
| 9,741,476 B2* | 8/2017 | Hiller | H01B 17/00 |

FOREIGN PATENT DOCUMENTS

| | | |
|---|---|---|
| CN | 208624451 U | 3/2019 |
| CN | 110037009 A | 7/2019 |
| DE | 10335229 A1 | 10/1999 |
| JP | H0711590 Y2 | 3/1995 |
| JP | 2964468 B2 | 10/1999 |
| RU | 2542355 C2 | 2/2015 |
| WO | 2019241055 A1 | 12/2019 |

OTHER PUBLICATIONS

Raptor Guard Pole Top Cap Perching Deterrents, accessed from powerlinesentry.com Dec. 21, 2019.
Birdguard, http://kaddas.com/birdguard Mar. 5, 2015.
Preformed Line Products, Raptor Protector & Trade, http://preformed.com/energy/distribution/wildlife-protection/raptor-protector, preformed.com 2017.

* cited by examiner

AVIAN STREAMER DETERRENT FOR ELECTRIC POWER LINE SUPPORT STRUCTURES

FIELD OF THE DISCLOSURE

The present invention generally relates to utility systems, and more particularly to mitigating damage to utility system components by avian species.

BACKGROUND

The North American power grid has been characterized by the Smithsonian Institution as the largest machine ever built by mankind. The size, geographic diversity, environmental diversity, and the multitude of components that comprise the power grid presents unique challenges in the rapid and efficient upgrading the system with diverse new technologies that realize America's objective of improved power grid reliability and hardening. Accordingly, utility systems are an integral part of modern day life. Unfortunately, components of these systems may become inoperable. For example, consider transmissions lines and their supporting structures that are part of a power grid. Transmission lines usually carry power from, for example, power generation facilities to regional and local substations. Transmission line support structures are utilized to support the transmission lines, carrying electricity across a geographical area. In many instances, transmission lines and their support structures are susceptible to damage, which may result in power outages throughout the grid. Power outages decrease customer satisfaction and increase costs incurred by the utility provider.

SUMMARY OF THE INVENTION

In one embodiment, an avian streamer deterrent system is disclosed. The avian streamer deterrent system comprises an electric power line support structure coupled to a plurality of conducting wires. Each conducting wire of the plurality of conducting wires is coupled to an insulator. At least one avian streamer deterrent is disposed above the insulator of at least one of the conducting wires of the plurality of conducting wires.

The at least one avian streamer deterrent, in one or more embodiments, is disposed on a wire such as an overhead ground wire that is absent an insulator and situated above the plurality of conducting wires. However, in other embodiments the at least one avian streamer deterrent is not disposed on the wire but is disposed above the wire and plurality of conducting wires. In at least one embodiment, the at least one avian streamer deterrent is disposed above and extends over one or more jumpers coupling at least a first conducting wire of the plurality of conducting wires to a second conducting wire of the plurality of conducting wires. The plurality of conducting wires, in one embodiment, are vertically aligned with respect to each other.

The at least one avian streamer deterrent, in one embodiment, comprises a hollow member comprising an inner wall defining a cavity. The cavity, in one embodiment, is configured to receive a wire such as a ground wire disposed above the plurality of conducting wires. The at least one avian streamer deterrent, in one embodiment, further comprises two or more fins extending outward from and longitudinally across the hollow member. The hollow member, in one embodiment, is configured to rotate about the wire. In one embodiment, the hollow member comprises a helical configuration.

The at least one avian streamer deterrent, in one embodiment, is a collapsible member. The collapsible member, in one embodiment, is coupled to a housing disposed on a top portion of the electric power line support structure. The collapsible member comprises an elastic band having a first end and a second end. A portion of a body of the elastic band passes through a hole in a side of the housing, and the first end is situated within and contacts an interior portion of the housing.

The at least one avian streamer deterrent, in one embodiment, comprises a hollow member having an inner wall defining a cavity circumscribing a wire such as a ground wire disposed above the plurality of conducting wires. The at least one avian streamer comprises two or more fins extending outward from and longitudinally across the hollow member. The avian streamer deterrent system, in one embodiment, further comprises at least one additional avian streamer deterrent that comprises one or more collapsible members disposed above the wire.

In another embodiment, an avian streamer deterrent is disclosed. The avian streamer deterrent comprises a housing and at least one collapsible member. The housing comprises a plurality of sides and is configured to receive a top portion of an electric power line support structure. The at least one collapsible member is coupled to one side of the plurality of sides and configured to extend above and over one or more of an insulator disposed on a conducting wire or a jumper coupling at least two conducting wires together.

The collapsible member, in one embodiment, comprises an elastic band. The elastic band, in one embodiment, comprises a first end and a second end, wherein a portion of a body of the elastic band passes through a hole in the side of the housing. The first end is situated within and contacts an interior portion of the housing. The at least one collapsible member, in one embodiment, is comprised of a plurality of hinged members each coupled to an adjacent hinged member of the plurality of hinged members. A single hollow member or multiple hollow members may surround a portion of the at least one collapsible member extending from an outer wall of the one side. In other embodiments, the at least one collapsible member is a rigid or semi-rigid member coupled to the one side via a hinged mechanism.

In a further embodiment, another avian streamer deterrent is disclosed. The avian streamer deterrent comprises a hollow member and two of more fins. The hollow member comprises a helical configuration. An inner wall of the hollow member defines a cavity configured to receive wire such as a ground wire coupled to an electric power line support structure and disposed over at least one insulator of a conducting wire. The two or more fins extend outward from and longitudinally across the hollow member.

The hollow member, in one embodiment, is configured to rotate about the wire. The at least one of the two or more fins, in one embodiment, comprises one or more weights disposed across an outer edge of the at least one of the two or more fins. Also, the at least one of the two or more fins, in one embodiment, is configured to be removably coupled to at least one additional fin.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
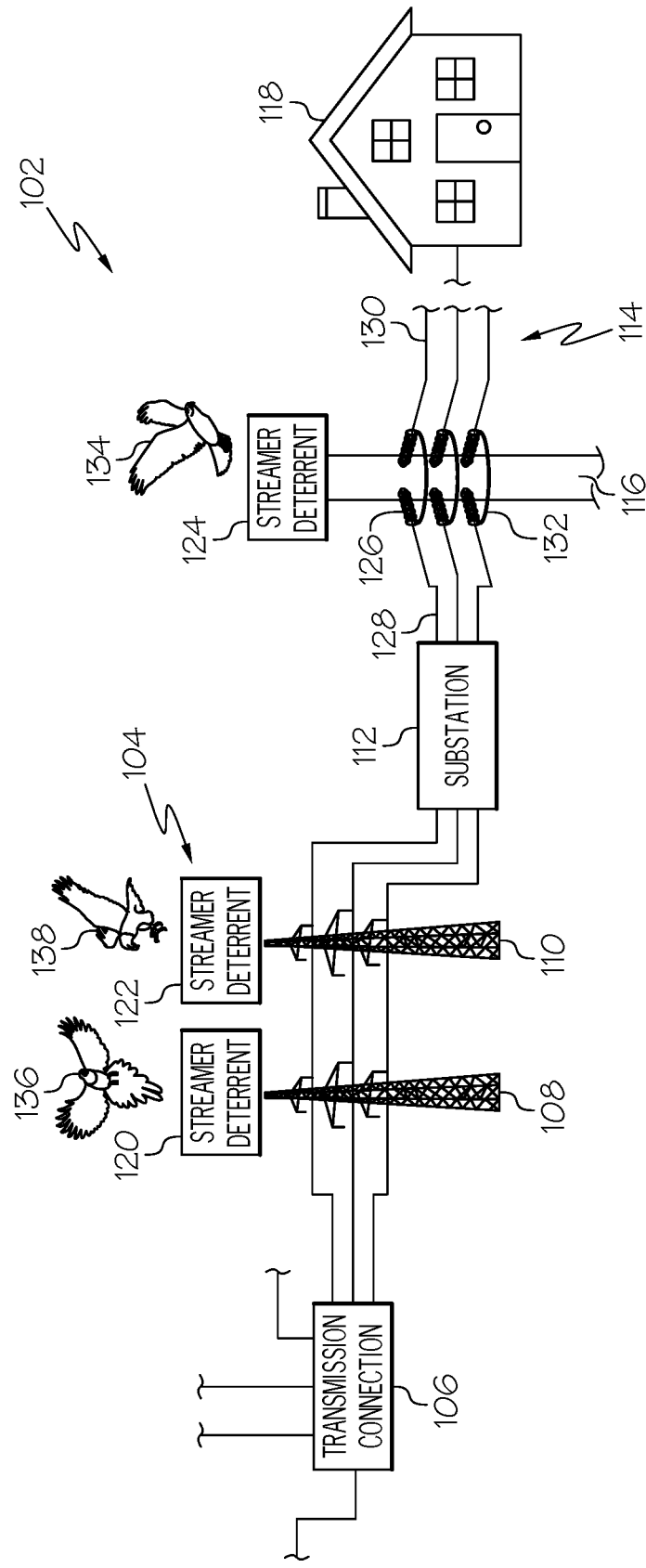
FIG. 1 is an illustrative example of an operating environment according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

As discussed above, when components of a utility system are damaged power outages may occur throughout the grid thereby decreasing customer satisfaction and increasing costs incurred by the utility provider. Transmission/distribution lines are one example of a utility system component that is susceptible to damage. In many environments, damage to transmission lines may be the result of birds perching on the transmission line supporting structure (e.g., utility pole). For example, birds tend to perch and roost on transmission lines and their supporting structures for various reasons such as safety, increased vantage points, lack of alternative perching locations, and/or the like. In many instances, birds prefer to perch on portions of the transmission lines closest to the support structure since the line is the most stable at this location and the support structure potentially provides increased safety for the perching bird.

Unfortunately, birds pose a threat to transmission lines and vice/versa. In particular, when birds perch on a transmission line or supporting structure they relieve themselves of excrement. A string of bird excrement can create a bridge across the air gap situated between a transmission line and the grounded support structure. This bridge may cause a momentary arch fault to the grounded structure, which results in an interruption of power on the transmission circuit. Avian streamers are one of the highest contributor of wildlife related transmission interruptions. For example, a 5-year study of transmission lines in Florida with excessive unknown cause outages revealed an estimated 29% of the unknown outages were attributable to bird streamers. See Burnham, J. T. 1995, "Bird Streamer Flashovers on FPL Transmission Lines", IEEE Transactions on Power Delivery 50(2): 970-977. In addition, avian excrement can cause damage to other equipment installed on a transmission line supporting structure due to the chemical makeup of the excrement. Even further, a bird's wings may inadvertently contact multiple energized wires causing imminent harm to itself and damaging the transmission lines and equipment.

One or more embodiments overcome these and other problems by providing a first avian streamer/perching deterrent configured to be disposed around a wire such as a ground wire situated above power conducting lines/wires, insulators, and/or jumpers. The first avian streamer deterrent, in one embodiment, comprises a hollow shaft/member configured to circumscribe the wire and further comprises one or more members extending out from the hollow member. The hollow member is further configured to be disposed above insulators and/or jumpers coupled to power conducting lines. The first avian streamer deterrent is configured to rotate/spin upon a bird trying to perch upon one of the extending members thereby persuading the bird to find another perching location and prevent unwanted perching and streamer damage from occurring.

Other embodiments provide a second avian streamer deterrent configured to be disposed over the top of a transmission/distribution line supporting structure and comprising collapsible members that extend over one or more power conducting lines (and/or components such as insulators and jumpers) coupled to the structure. The collapsible members are configured maintain their rigid/semi-rigid state until a bird attempts to perch on the collapsible member. The force exerted upon the member by the bird's weight causes the member to collapse thereby persuading the bird to find another perching location and preventing unwanted perching and streamer damage from occurring.

FIG. 1 shows one example of an operating environment for implementing avian streamer/perching deterrents according to one or more embodiments. In particular, the environment shown in FIG. 1 is a utility system 102. Utility systems may include power grid systems (e.g., fossil fuel based, solar-based, wind-based, nuclear-based generation, transmission and/or distribution subsystems), telephone systems (landline and wireless), water systems, gas systems, and oil systems. Each of these different types of utility systems may have multiple types of subsystems. For example, an electric power delivery system generally comprises a generation subsystem, a transmission subsystem, and a distribution subsystem. Each of these of these subsystems performs one or more specific functions and comprises multiple components. For example, the distribution subsystem of an electric power system comprises substations where each substation performs various functions for a power grid such as transforming voltage, connecting transmissions lines, transferring power, and protecting the grid from short circuits and overload currents, and/or the like. Components of a substation include, but are not limited to, incoming and outgoing power lines, transformers, disconnect switches, circuit breakers, arresters, etc. Other non-limiting examples of utility system components include utility poles, transmissions lines, solar panels, cooling towers, pipelines, and/or the like.

In the example shown in FIG. 1, the utility system 102 is an electrical power "grid" that is used to provide electrical power to consumer premises. The utility system 102 may include various power generation components (not shown) such as a cycle gas generator, a solar array farm, and a wind farm. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 104. The illustrated example depicts a transmission connection 106 that couples one or more sources within power generation components to the power transmission system 104. The power transmission system 104 and transmission connection 106 in an example include suitable step-up transformers and long-distance transmission lines supported by various structures 108, 110 to convey the generated electrical power to remote power distribution networks, other electrical power consumers, or both.

The illustrated power transmission system 104 provides electrical power to one or more distribution systems including a substation 112, distribution lines 114, distribution line support structures 116, and customer premises 118. The substation 112 AOI may include transformers, protection devices, and other components to provide electrical power to power distribution lines 114. The power distribution lines 114 deliver power produced by the generating components to customer premises, such as the illustrated home 118. The support structures 116 are utilized to support and carry the distribution lines across a geographical area to their desired destinations. The customer premises 118, in general, are coupled to the power distribution system 104 and are able to include any combination of residential, commercial, or industrial buildings.

In one embodiment, transmission line supporting structures 108, 110 and distribution line supporting structures 116 comprise one or more avian streamer/perching deterrents 120 to 124 discussed in greater detail below with respect to FIG. 2. In one embodiment, the avian streamer/perching deterrents 120 to 124 comprise one or more members that are disposed above and extend over insulators 126 coupled to power conducting lines/wires 128, 130; jumpers coupling 132 two or more conductive lines/wires 128, 130; and/or the like. These deterrent members, in one embodiment, are disposed on and in contact with a wire such as an overhead ground wire that is disposed above these components. However, in other embodiments, the deterrent members are not disposed on any wire/line. As will be discussed in greater detail below, the avian streamer/perching deterrents persuade birds 134 to 138 to find other perching locations and prevents unwanted perching and streamer damage from occurring.

Figure 2:
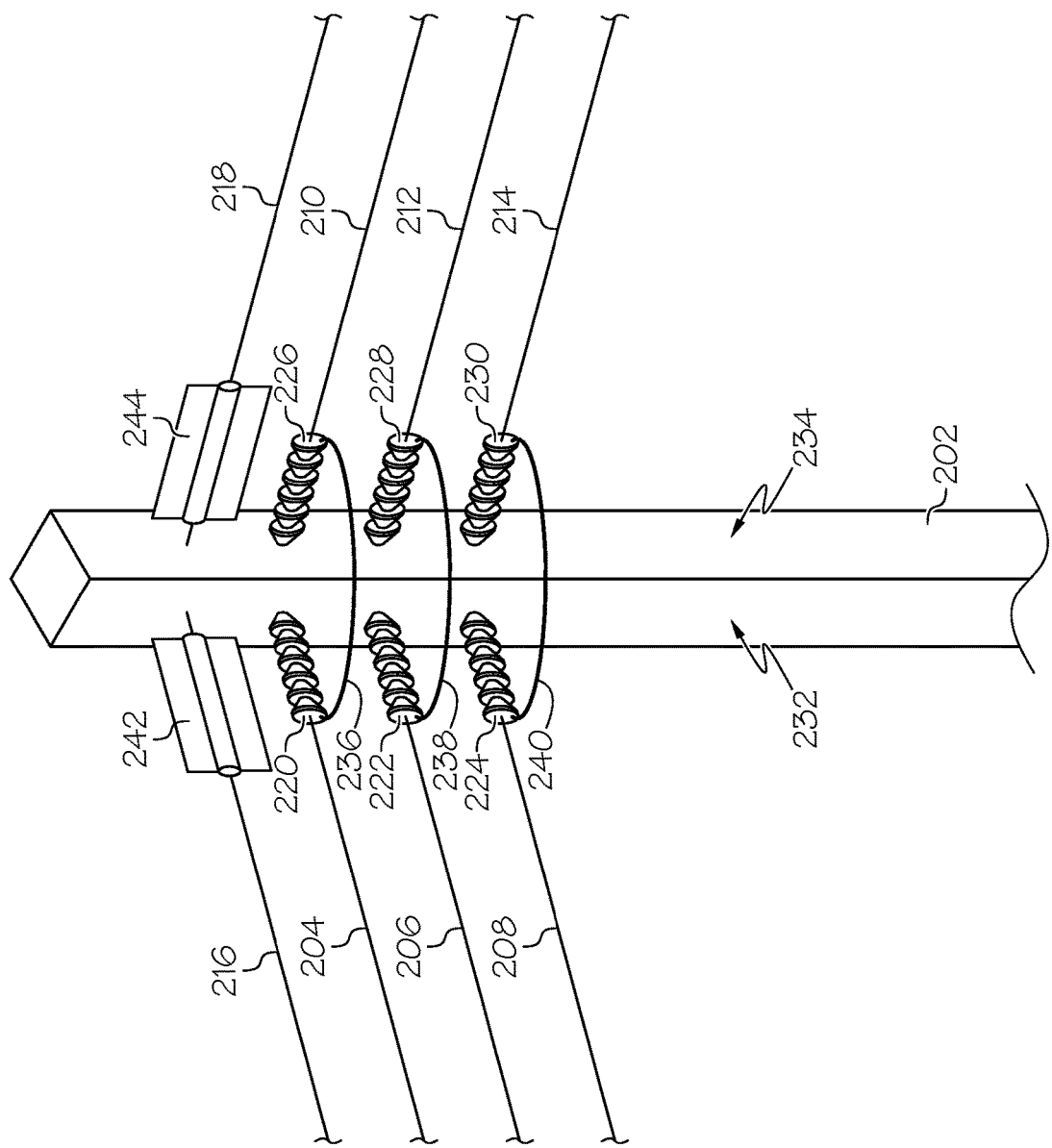
FIG. 2 is an illustrative example of an electric power line support structure and its various components including a first avian streamer/perching deterrent according to one embodiment of the present invention.

FIG. 2 shows one example of an environment in which a first avian streamer deterrent may be implemented. In particular, FIG. 2 shows one example of a power line supporting structure 202 for supporting transmission and/or distribution lines/wires 204 to 214; one or more overhead ground wires, static wires, shield wires, or other non-power conveying conducting wires; insulators 220 to 230; transformers (not shown); surge arrestors (not shown); fuses (not shown); and/or the like. The transmission and/or distribution lines/wires 204 to 214 conduct electricity at high voltages, distribution level voltages, and/or the like and are also referred to herein as "power conducting lines/wires 204 to 214". The configuration shown in FIG. 2 may be referred to as a monopole support structure with vertically framed power conducting wires 204 to 214 and a ground wire 216 and 218. However, embodiments of the present invention are not limited to this type of supporting structure or configuration as one or more embodiments are applicable to various types of supporting structures and configurations. It should be noted embodiments are applicable to both transmission line and supporting structures as well as distribution lines and supporting structures.

In the example shown in FIG. 2, the supporting structure 202 is a substantially vertical structure that may be driven or anchored into the ground, fastened to a base, and/or the like. It should be noted that the supporting structure 202 may comprise multiple vertical structures as compared to the single vertical structure shown in FIG. 2. The supporting structure 202, in one embodiment, may be comprised of various materials such as wood, metal, concrete, composites, a combination thereof, and/or the like. In one embodiment, the supporting structure 202 is grounded utilizing one or more grounding mechanisms such as ground rods, pole butt grounds, and/or the like.

Power conducting lines 204 to 214 may be coupled to the supporting structure 202 in various ways. For example, FIG. 2 shows a first set of insulators 220 to 224 coupled to a first side 232 of the supporting structure 202 and a second set of insulators 226 to 230 couple to a second side 234 of the supporting structure 202. Each of a first set of power conducting lines 204 to 208 are coupled to one of the insulators in the first set of insulators 220 to 224 and each of a second set of transmission lines 210 to 214 are coupled to one of the insulators in the second set of insulators 226 to 230. The insulators 220 to 230, in one embodiment, are coupled to their respective side of the supporting structure 202 by one or more fastening mechanisms. The power conducting lines 204 to 214 may be coupled to their respective insulator 220 to 230 by one or more fastening mechanisms as well.

In the example shown in FIG. 2, each of the first set of power conducting lines 204 to 208 on the first side 232 of the structure is coupled to a corresponding one of the second set of power conducting lines 210 to 214 on the second side 234 of the 202 by a respective jumper 236 to 240. It should be noted that, in other embodiments, the power conducting lines 204 to 214 do not terminate at the support structure 202 and are continuous. In this embodiment, the jumpers 236 to 240 are not required.

In one embodiment, a first ground wire 216 is coupled to the first side 232 of the supporting structure 202 and a corresponding second ground wire 218 is coupled to the second side 234 of the supporting structure 202. The ground wires 216 and 218 may be coupled to the supporting structure 202 via one or more fastening mechanisms. In one embodiment, The ground wires 216 and 218 direct lightning surges to ground or create a return path for current. In one embodiment, the ground wires 216 and 218 are disposed above the power conducting lines 204 to 214. However, in other embodiments, the ground wires 216 and 218 are disposed below the power conducting lines 204 to 214. In addition, the power conducting lines 204 to 214 and/or ground wires 216 and 218 are not required to terminate at the support structure 202 as a continuous lines/wires may be utilized instead.

The example shown in FIG. 2 illustrates the ground wires 216 and 218 as the highest pole mounted wire at or near the top of the structure 202. Therefore, if a bird is able to perch on the ground wires 216 and 218 the underlying transmission lines 204 to 214 and/or insulators 220 to 230 are at risk for bird streamer caused interruptions. Therefore, in at least one embodiment, one or more avian streamer deterrents 242 and 244 are disposed on the ground wires 216 and 218. However, in embodiments where another conducting or ground wire/cable is the highest mounted wire/cable, such as a distribution line conductor framing, the avian streamer deterrents 242 and 244 may be disposed on these wires/cables instead.

The streamer deterrent 242 and 244, in one embodiment, is disposed in close proximity to the support structure 202 and effectively shifts perching behavior away from bird streamer sensitive locations on the transmission line structure. In one embodiment, one or more streamer deterrents 242 and 244 are disposed above and over the insulators 220 to 230 and/or one or more streamer deterrents 242 and 244 are disposed above and over the jumpers 236 to 240.

As will be discussed in greater detail below, the streamer deterrents 242 and 244 are configured to rotate/spin upon a bird trying to land and perch on the deterrents. The rotation of the deterrents 242 and 244 creates a very unstable platform for the bird to perch on and persuades the bird to locate another perching location. The streamer deterrents 242 and 244 of one or more embodiments are advantageous over conventional deterrents that are placed over the top of the supporting structure since the conventional deterrents may influence perching directly adjacent to the structure on the overhead ground wire leaving the underlying transmission lines still susceptible to bird streamer interruptions. The streamer deterrents 242 and 244 of one or more embodiments, on the other hand, are disposed over/above the equipment susceptible to bird streamers.

FIGS. 3-8B show various examples of a first streamer deterrent 242 according to one embodiment of the present invention. The streamer deterrent 242, in one embodiment, comprises a central shaft 302 configured to accept and surround a wire/cable such as the ground wire 216, 218; conducting line 204 to 214; and or the like. In one embodiment, the shaft 302 may be a singular piece of material having a helical configuration comprising a first end 402 and a second end 404 each running longitudinally along the length of the shaft 302. The first end 402 curves towards an inner cavity 406 defined by an inner wall 408 of the shaft 302. The second end 404 curves to the outside of the first end 402. The first and second ends 402, 404 of the shaft 302 are separated by a space 410 for receiving a wire/cable and wrapping the shaft 302 around the wire/cable. The shaft 302 may comprise a flexible but rigid material that allows the first and second ends 402, 404 to be spread out for receiving the wire/cable while returning back to their original configuration.

In other embodiments, the shaft 302 may not have a helical configuration. For example, in one embodiment, the shaft 302 is be split into multiple portions that are fastened together by bolts, snap/pressure locking mechanisms, and/or the like. One end of two portions may be coupled together via one or more hinges such that the only the opposing ends need to be fastened once the shaft 302 is placed around the wire/cable. In one embodiment, the shaft 302 comprises a material that is softer than the wire/cable it receives so that the shaft 302 wears down before damage is caused to the wire/cable. The shaft 302 may also comprise a bearing, anti-friction coating, or other elements to help reduce abrasion experienced by the wire/cable and/or increase rotation/spinning of the deterrent 242 around the wire/cable.

Figure 3:
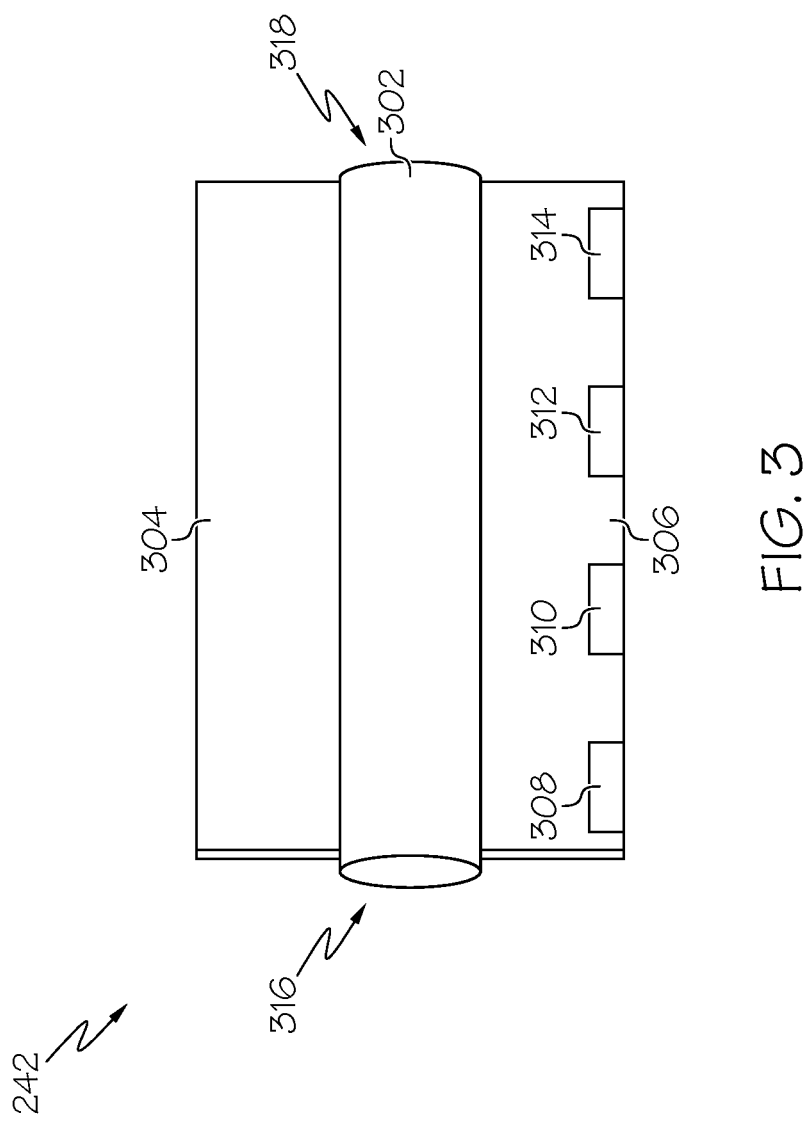
FIG. 3 is a side view of the first avian streamer/perching deterrent according to one embodiment of the present invention.
Figure 4:
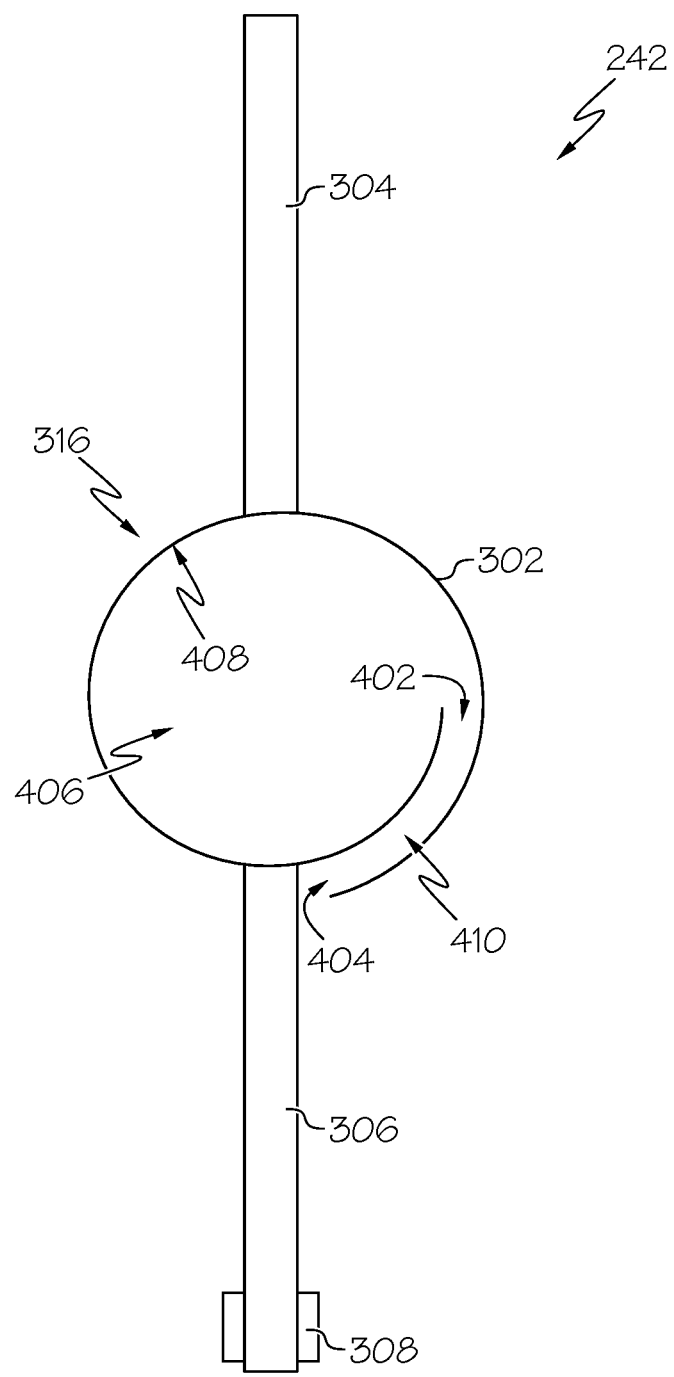
FIG. 4 is a front view of the first avian streamer/perching deterrent according to one embodiment of the present invention.
Figure 5:
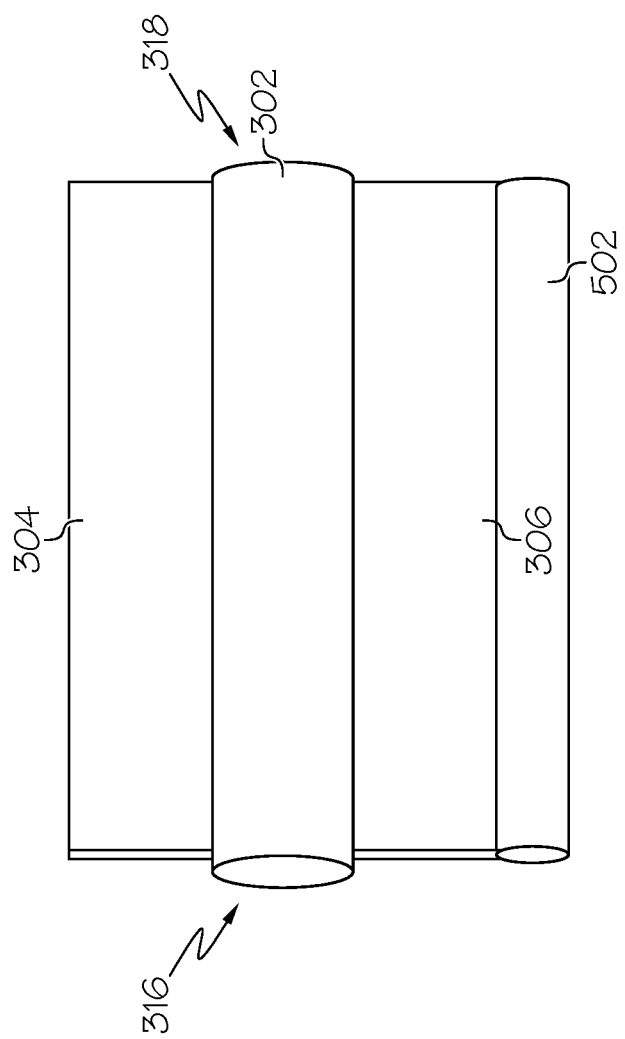
FIG. 5 is a side view of the first avian streamer/perching deterrent having a single weighted member disposed on the outer edge of at least one fin according to one embodiment of the present invention.

The streamer deterrent 242 further comprises two or more fins 304, 306 disposed on the outside of the shaft 302 and extending longitudinally along the length of the shaft 302. The fins 304, 306 may be molded to their respective portion of the shaft 302 or may be detachable for easy replacement/repair. In an embodiment where one or more of the fins 304, 306 are detachable they may be fastened to the shaft 302 via one or more fastening mechanisms such as bolts, screws, pressure fit, snap-lock, and/or the like. In at least some embodiments, the fins 304, 306 are situated in an opposing configuration as shown in FIGS. 3 and 4. However, embodiments of the present invention are not limited to such a configuration. Other applicable configurations include, but are not limited to, a four fin configuration where each fin is situated 90 degrees apart; a three fin configuration where two of the fins are situated 90 degrees apart and 135 degrees apart from the third fin; an eight fin configuration where each fin is situated 45 degrees about; or any other configuration.

Figure 6:
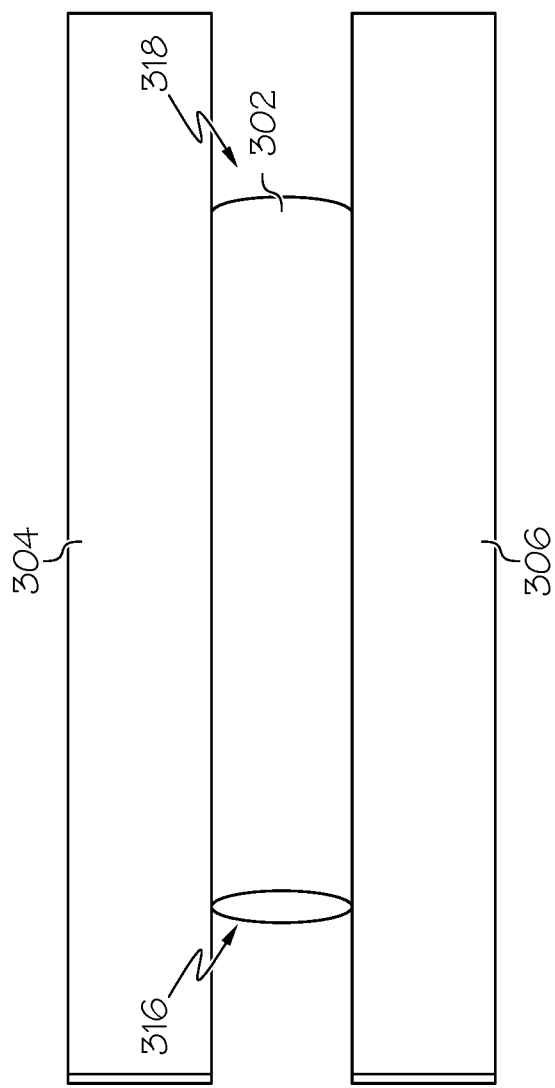
FIG. 6 is a side view of the first avian streamer/perching deterrent where one or more fins extend laterally beyond the central shaft according to one embodiment of the present invention.
Figure 7:
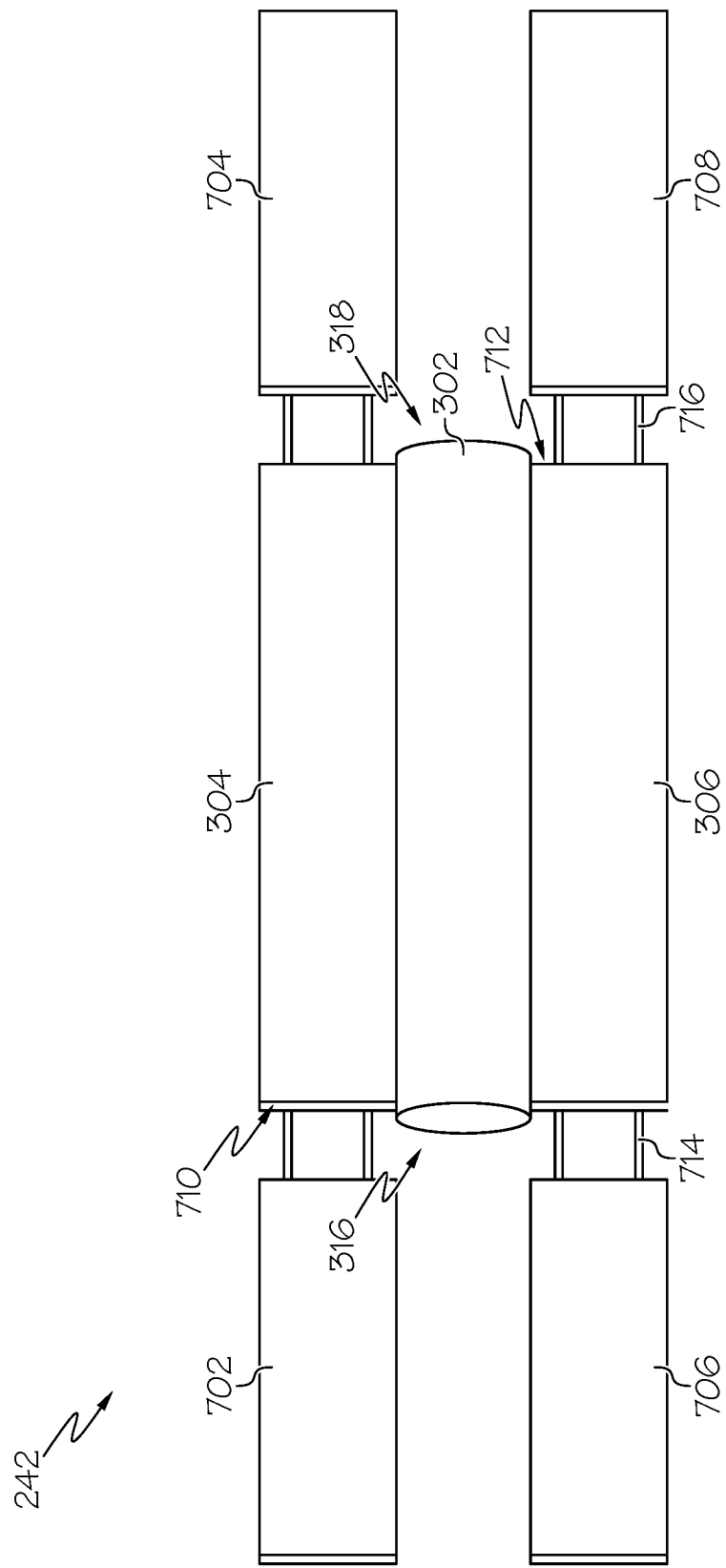
FIG. 7 is a side view of the first avian streamer/perching deterrent where one or more of the fins are removably coupled to one or more additional fins according to one embodiment of the present invention.

In a multi-fin configuration such as that shown in FIGS. 3 and 4, at least one of the fins 306 may be weighted to help orient an opposing fin 304 in a substantially vertical direction (e.g., perpendicular to the ground) when in a resting state on the wire/cable. The weighted fin 306 also helps stabilize the fin in windy environments. In one embodiment, weights 208 to 314 or a weight bar 502 (FIG. 5) may be adhered or molded into the fin 306. In some instances, it may be desirable to have at least one of the fins 304, 306 extend beyond at least one end 316, 318 of the shaft 302, as shown in FIG. 6. In one embodiment, the fins 304, 306 may have a length that is longer than the length of the shaft 302. However, in other embodiments, one or more additional fins 702 to 708 may be attached to the fins 304, 306 already molded/attached to the shaft 302 via one or more fastening mechanisms as shown in FIG. 7.

In this embodiment, the ends of the fins 304, 306 may comprise male/female coupling mechanisms 710, 712 that mate with corresponding male/female coupling mechanisms 714, 716 of the fins 702 to 708 to be attached thereto. In addition, entire streamer deterrents may be coupled together in a similar fashion by coupling together their fins. These embodiments allow the length of the streamer deterrent 242 to be customized. The shaft 302 and fins 304, 306 may be comprised of the same or different materials. Examples of materials include, but are not limited to, plastics (e.g., polyethylene, polypropylene, polyvinyl chloride, and/or the like), other synthetics, metals, composites, natural materials, and/or the like). The shaft 302 and fins 304, 306 may also comprise one or more coatings, chemicals, etc. to prevent premature degradation due to environmental conditions.

Figure 8B:
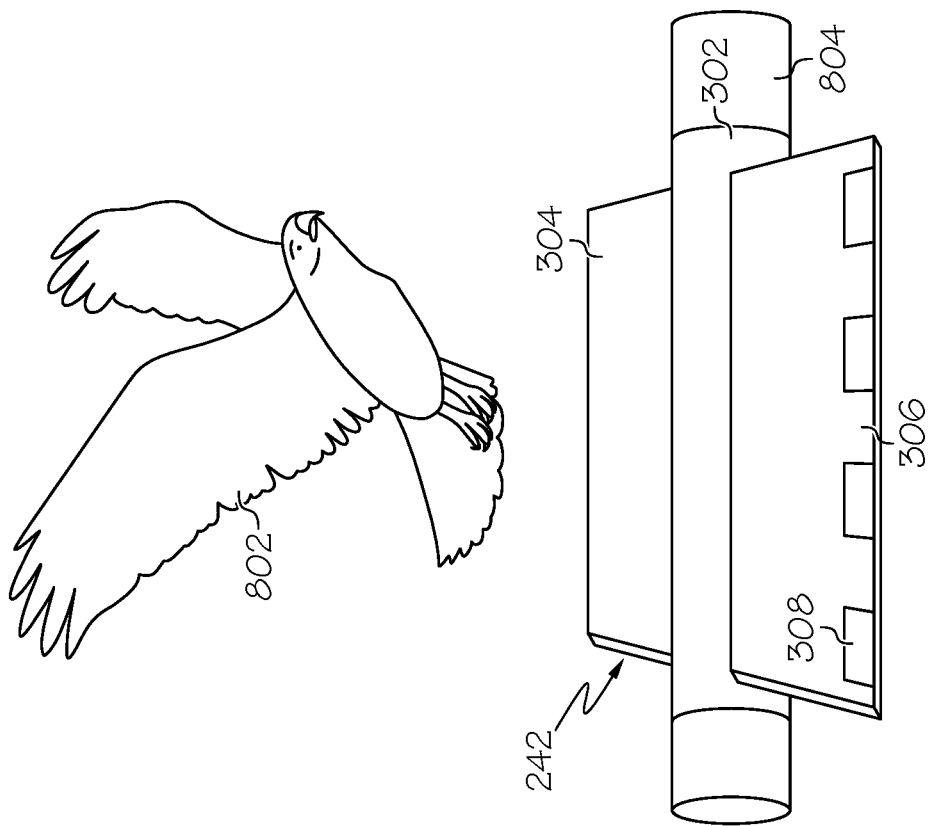
FIG. 8B illustrates the first avian streamer/perching deterrent having rotated about the wire thereby discouraging the bird from perching thereon according to one embodiment of the present invention.
Figure 8A:
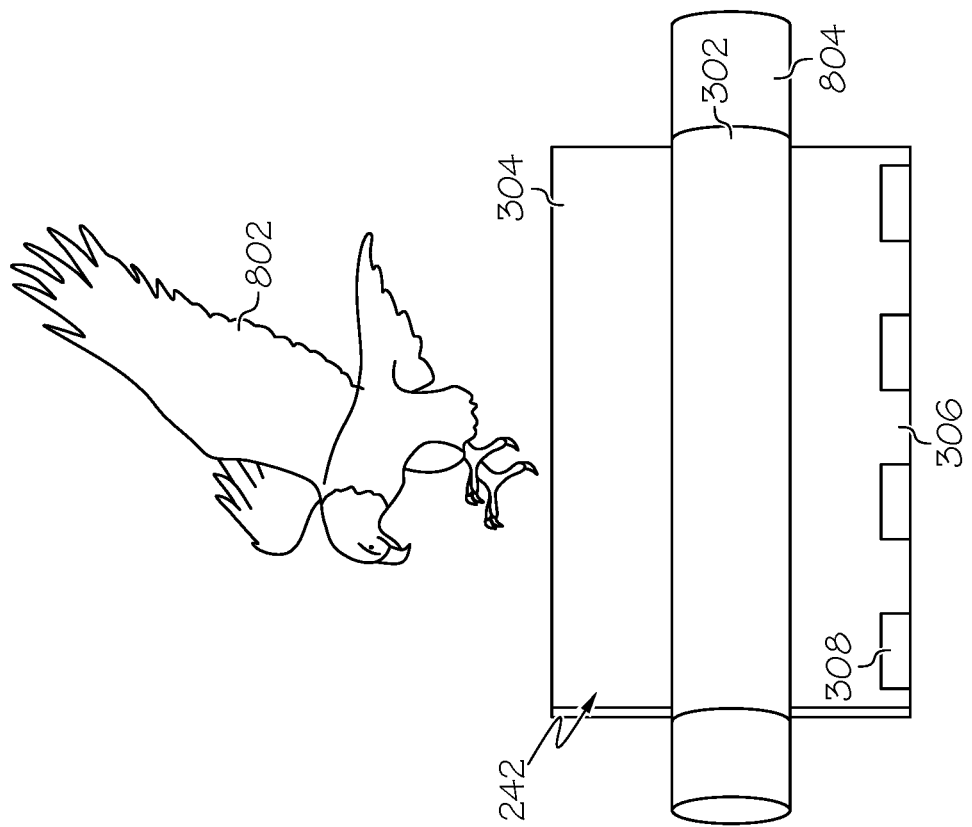
FIG. 8A illustrates one example of a bird trying to perch on the first avian streamer/perching deterrent disposed on a wire according to one embodiment of the present invention.
Figure 9:
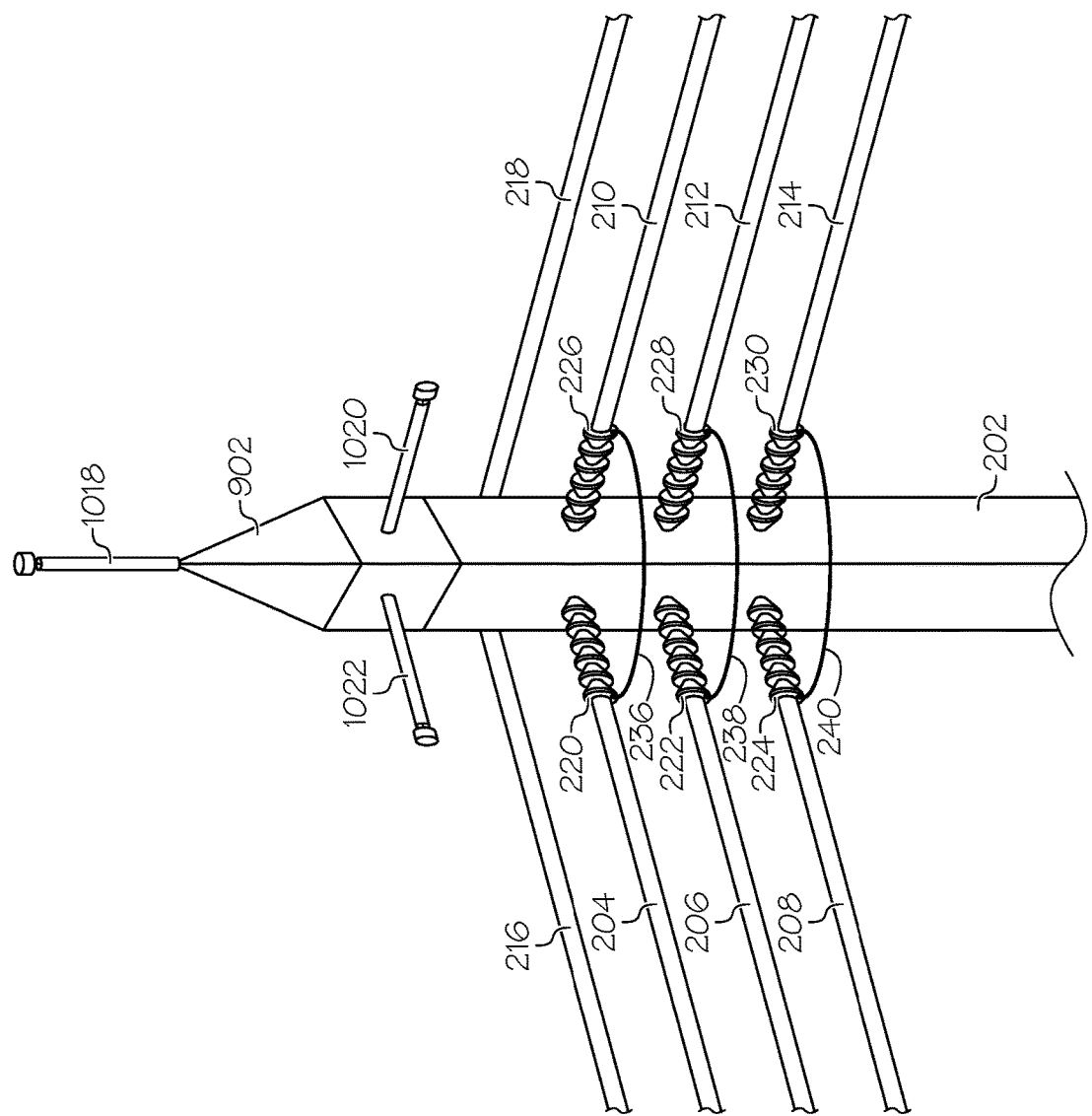
FIG. 9 is an illustrative example of the electric power line support structure and its various components including a second avian streamer/perching deterrent according to one embodiment of the present invention.

When a bird lands on one of the fins 304, 306 to perch the weight of the bird causes the streamer deterrent 242 to rotate around wire/cable causing the bird to fly away. In other words, the streamer deterrent 242 does not provide a stable perching area for the bird and, therefore, safely causing the bird to look for other perching locations without any injury or harm to the bird while protecting the sensitive underlying equipment. For example, FIG. 8A shows one example of a bird 802 attempting to perch on the streamer deterrent 242. As the bird places its foot on the fin 304 the bird's weight causes the shaft 302 to rotate about the wire/cable 804 as shown in FIG. 8B. The movement and instability of the streamer deterrent 242 persuades the bird 802 to fly away.

Figure 10:
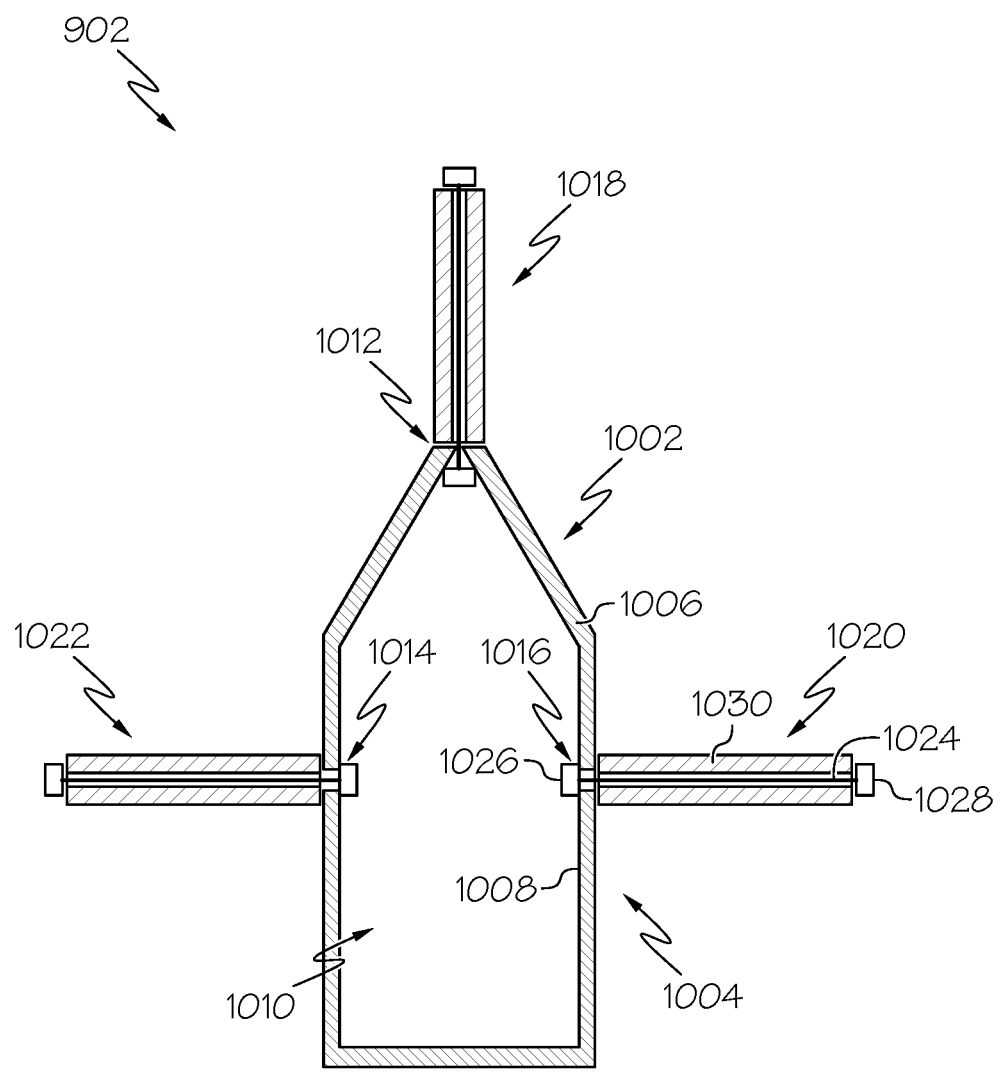
FIG. 10 is a side view of a second avian streamer/perching deterrent according to one embodiment of the present invention.

FIGS. 9 to 15 show various examples of a second avian streamer deterrent 902 according to another embodiment of the present invention. The second avian streamer deterrent 902 differs from the first avian streamer deterrent 242 as it is configured to be placed over the top of a transmission line supporting structure as compared to being disposed adjacent to the structure 202 on a ground wire/cable 216. However, unlike conventional deterrent caps that may influence perching directly adjacent to the structure, the streamer deterrent 902 comprises collapsible members 1018 to 1022 that extend over and above the power conducting lines 208 to 218, insulators 220 to 230, and/or the jumpers 236 to 240. When a bird tries to land on the member it collapses, thereby persuading the bird to find another perching location. It should be noted that although FIG. 10 shows the ground wire 216, 218 as being situated above the power conducting lines 208 to 218, the ground wire 216, 218 may be situated below these lines 208 to 218 as well.

In one embodiment, the streamer deterrent 902 is a cap that is placed over the top of the electric power line support structure 202. The streamer deterrent 902 generally conforms to the shape of the top of the structure 202. In this embodiment, the streamer deterrent 902 comprises a triangular top section 1002 and a bottom section 1004 conforming to the shape (e.g., square, cylindrical, and/or the like) of the structure 202 as shown in FIG. 10. The streamer deterrent 902 comprises an outer wall 1006 and an inner wall 1008, where the inner wall 1008 defines a cavity 1010 for receiving a corresponding portion of the structure 202. The top and bottom sections 1002, 1004 of the streamer deterrent 902 may be comprised of the same or different materials. Examples of materials include, but are not limited to, plastics (e.g., polyethylene, polypropylene, polyvinyl chloride, and/or the like), other synthetics, metals, composites, natural materials, and/or the like). The top and bottom sections 1002, 1004 may also comprise one or more coatings, chemicals, etc. to prevent premature degradation due to environmental conditions.

In one embodiment, the top section 1002 of the streamer deterrent 902 comprises a hole/via 1012 at the apex and the bottom section 1004 comprises one or more holes/vias 1014, 1016 on each side. These holes/vias 1012 to 1016 are configured to receive a portion of a deterrent component 1018 to 1022. In one embodiment, one or more of the deterrent components 1018 to 1022 comprises a member 1024 having a first end 1026 and a second end 1028. The members 1024 disposed on the bottom section 1004 are situated, in one embodiment, substantially parallel to the ground or at any desired angle when in a resting position. The members 1024 disposed within the top section 1002 of the streamer deterrent 902 are situated, in one embodiment, substantially perpendicular to the ground or at any desired angle when in a resting position. In one embodiment, the member 1024 is an elastic/resilient band while in other embodiments the member 1024 is a rigid/semi-rigid structure.

The first end 1026 of the member 1024, in one embodiment, is disposed within the cavity 1010 of the streamer deterrent 902 and a portion of the body of the member 1024 passes through one of the corresponding holes/vias 1018. In one embodiment, the first end 1026 is larger in at least one dimension than the hole/via 1018 such that the first end 1026 is prevented from passing through the hole/via 1012. This configuration effectively "anchors" the streamer deterrent 902 and prevents unwanted removal of the member 1024 from the deterrent 902. In some embodiments, the first end 1026 of the member 124 is removable or adjustable such that the member 1024 can be removed from the streamer deterrent 902.

Figure 11:
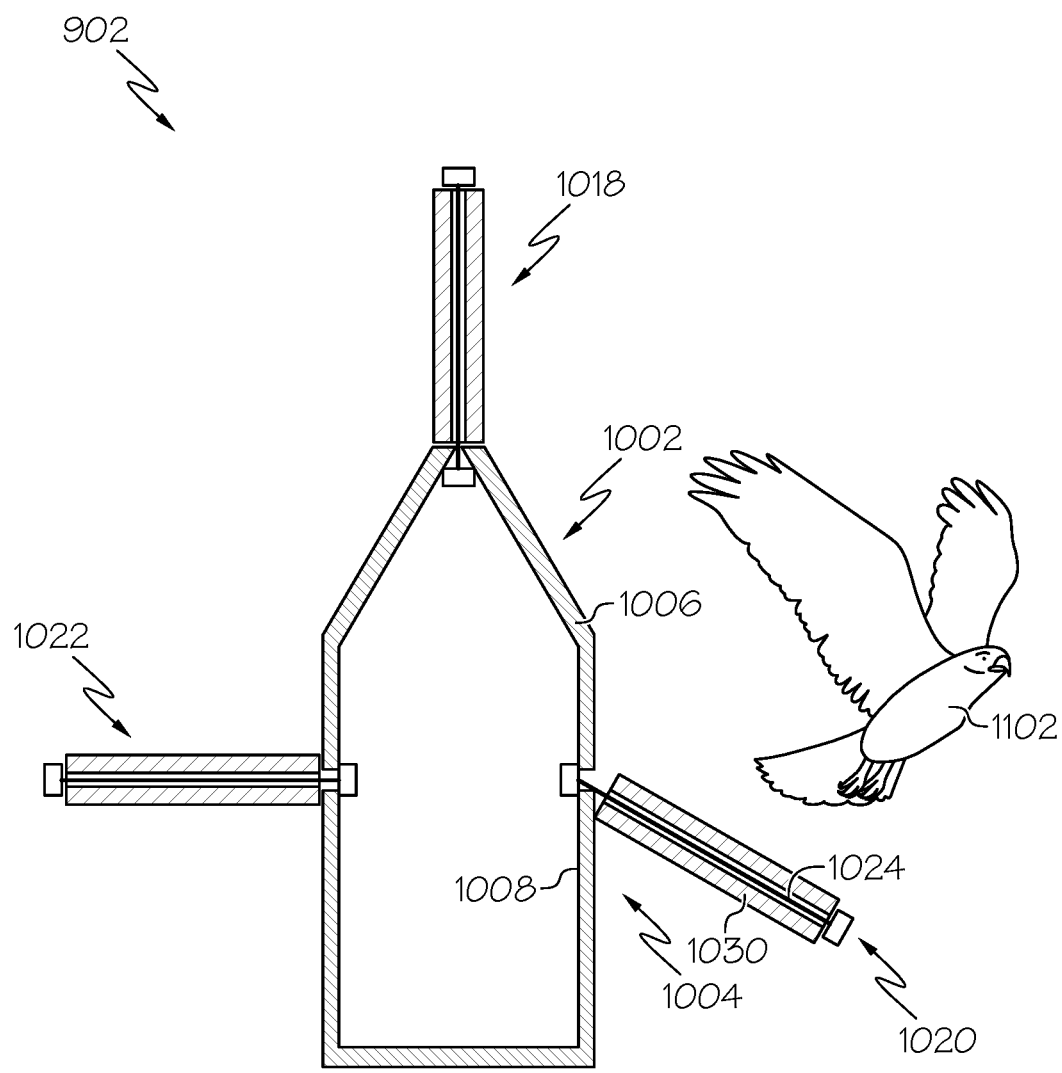
FIG. 11 is an illustrative example showing one of the collapsible member of the second avian streamer/perching deterrent having collapsed thereby deterring a bird from perching thereon according to one embodiment of the present invention.

In one embodiment, a portion of the body of the member 1024 extending from the outer wall 1006 of the streamer deterrent 902 is surrounded by a hollow rod/tube 1030. In this embodiment, the member 1024 is an elastic/resilient band that is tensioned such that the member 1024 holds the rod/tube 1030 against the outer wall 1006 of the bottom section 1004 of the streamer deterrent 902. For example, the first end 1026 of the member 1024 is pulled tight against the inner wall 1008 of the streamer deterrent 902 and the second end 1028 of the member 1024 is pulled tight against a corresponding end of the rod/tube 1030 while the opposing end of the rod/tube 1030 is pulled tight against the outer wall 1006 of the streamer deterrent 902. This configuration provides a degree of rigidity to the member 1024. The tension of the member 1024 is such that the member 1024 remains relatively parallel (or perpendicular) to the ground until a bird lands on the member 1024. Once a bird 1102 lands on the member 1024 it collapses causing the bird to fly away as shown in FIG. 11. In other words, the member 1024 does not provide a stable perching area for the bird 1102 and, therefore, causes the bird to look for other perching locations. Once the bird leaves the member 1024 the tension of the elastic band causes the member 1024 to return to its normal operating position (e.g., parallel or perpendicular to the ground).

Figure 12:
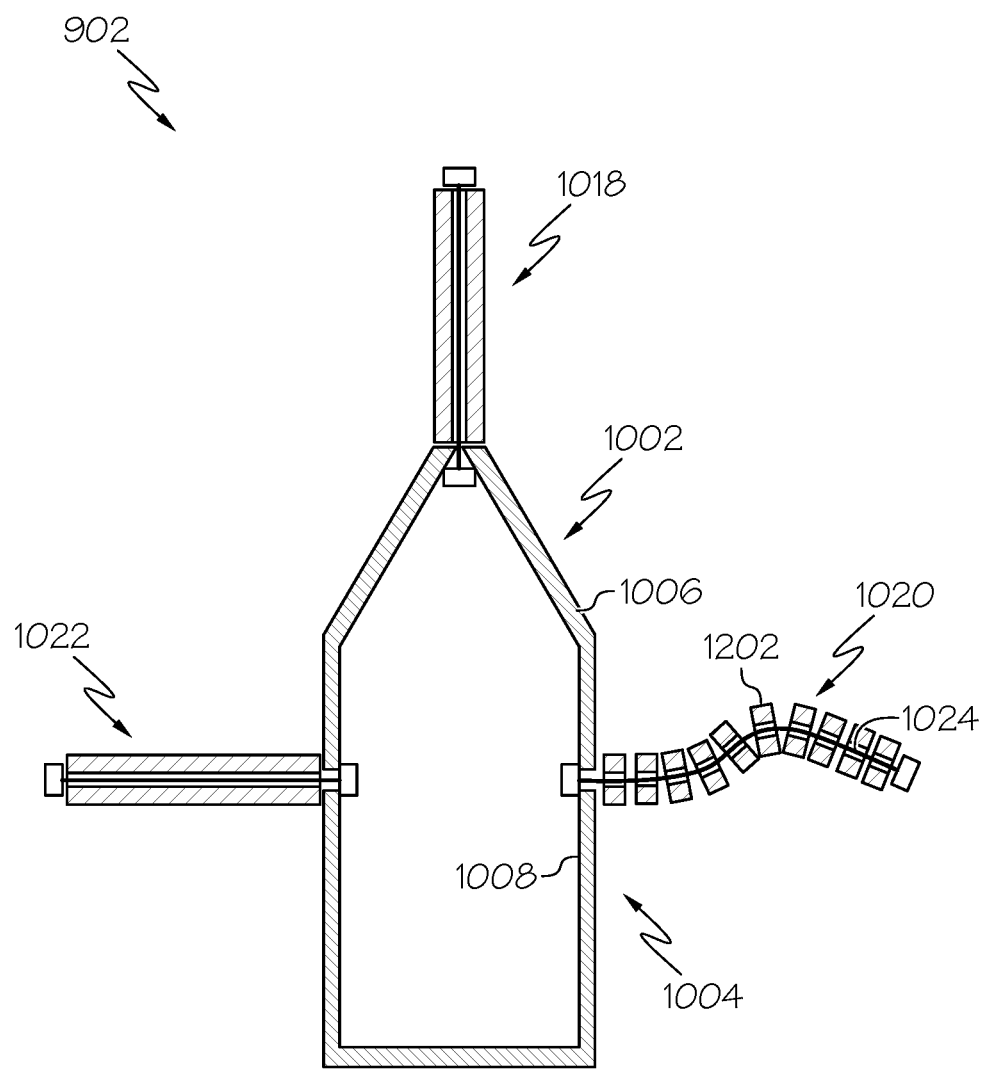
FIG. 12 is a side view of the second avian streamer/perching deterrent comprising a collapsible member having one or more bends/curves and a plurality of hollow members surrounding a body of the collapsible member according to one embodiment of the present invention.
Figure 13:
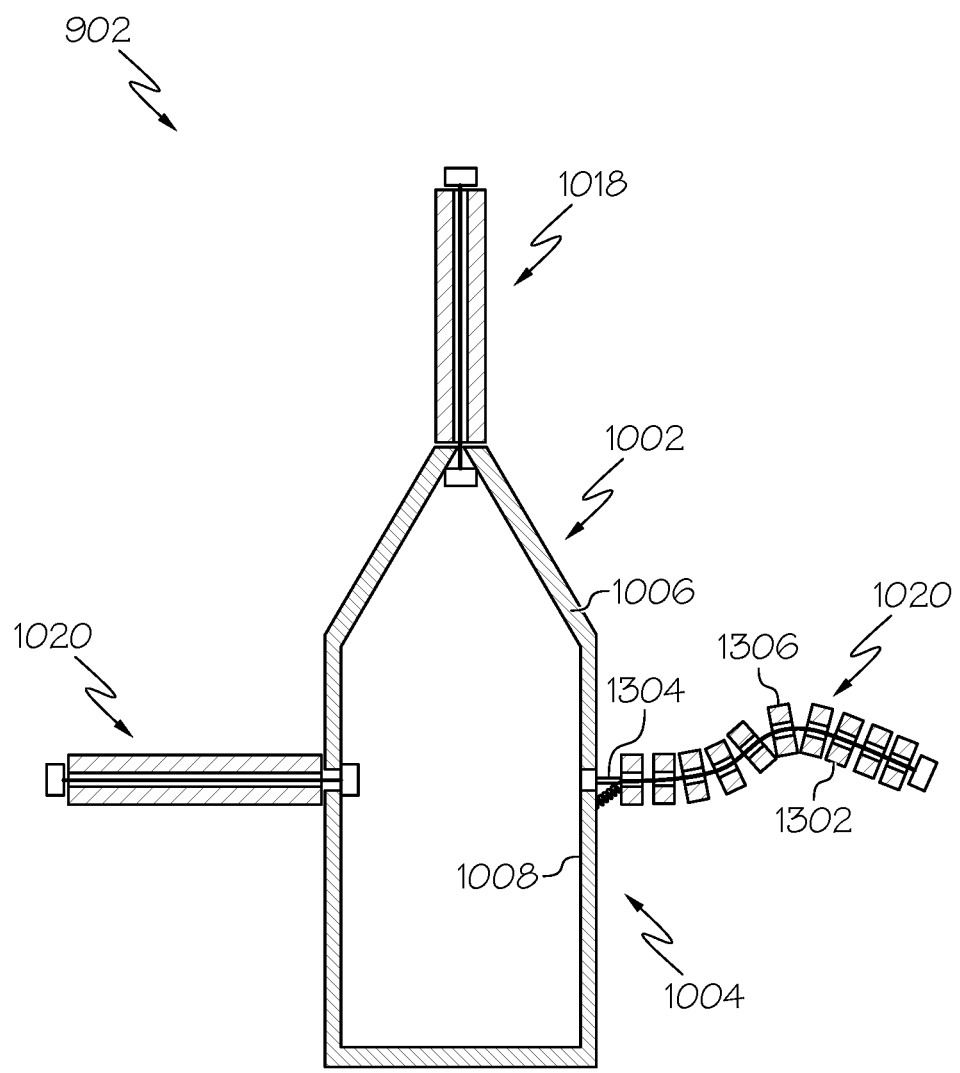
FIG. 13 is a side view of the second avian streamer/perching deterrent comprising a collapsible member coupled to the housing via one or more hinged mechanisms according to one embodiment of the present invention.

It should be noted that a singular rod/tube 1030 is not required. For example, FIG. 12 shows that instead of a singular rod/tube 1030 a plurality of beads/tubes 1202 or similar components surround the member 1024. The beads 1202 may have different shapes and provide a more natural landing area when a bird tries to perch on the deterrent 1020. In some embodiments, an elastic member 1024 may not be utilized. For example, a rigid member 1302 such as a rod, tube, wire, etc. may be utilized that can be straight or have multiple bends as shown in FIG. 13. In this embodiment, the rigid member 1302 may be attached to the outer side wall 1006 of the streamer deterrent 902 via one or more hinged mechanisms 1304 and may optionally be surrounded by multiple hollow beads/tubes 1306. The holes/vias, in this embodiment, are not required when implementing the rigid member 1302 with a hinged mechanism 1304.

The hinged mechanism 1304, in one embodiment, is coupled to the outer side wall 1006 of the streamer deterrent 902 and is also coupled to the member 1302. The hinged mechanism 1304 maintains the rigid member 1302 in an extended position (e.g., resting position) when not acted upon by an external force such as the weight of a bird. However, when a bird lands on the member 1302 the hinged mechanism 1304 transitions the member 1302 to a collapsed state similar to the embodiment discussed above with respect to FIG. 11. This causes the bird to fly away since the member 1302 does not provide a stable perching area for the bird and. Once the bird leaves the member 1302 the hinged mechanism 1304 returns the member 1302 to its resting state (e.g., extended position).

Figure 14:
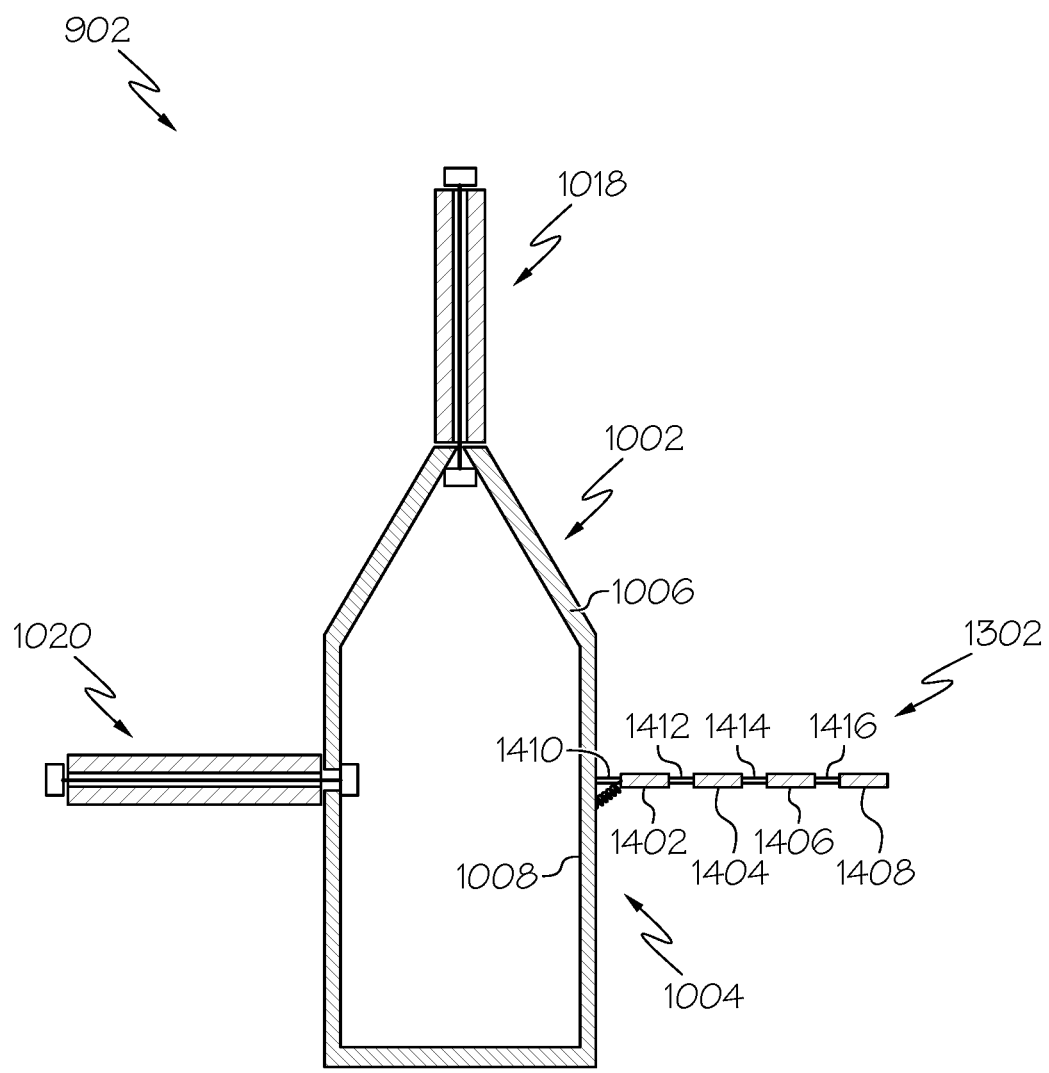
FIG. 14 is a side view of the second avian streamer/perching deterrent comprising a collapsible member having multiple portions that are each coupled to an adjacent portion by one or more hinged mechanisms according to one embodiment of the present invention.

In some instances, the force required to activate a hinged mechanism for collapsing the member 1302 increases as you move closer to the hinged mechanism 1304. Therefore, the force required to activate the hinged mechanism 1304 and collapse the member 1302 may not be exerted depending on where a bird tries to land on the member 1302 and the weight of the bird. One or more embodiments overcome this problem by dividing the member 1302 into a plurality of portions as shown in FIG. 14. For example, FIG. 14 shows the member 1302 comprising a plurality of separated portions 1402 to 1408. In one embodiment, each of the plurality of separated portions 1402 to 1408 is coupled to a hinged mechanism 1410 to 1416 while, in other embodiments, less than all of the portions 1402 to 1408 are coupled to a hinged mechanism. Also, in some embodiments, one end of a portion is pivotably coupled to an end of an adjacent portion of the plurality of portions 1402 to 1408. In one embodiment, the hinged mechanisms 1410 to 1416 allow each of the plurality of separated portions 1402 to 1408 to collapse independently of each other. Therefore, no matter where a bird tries to land on the member 1302, the portion upon which the bird tries to land will collapse thereby causing the bird to fly away. Once the bird leaves the corresponding hinged mechanism(s) 1410 to 1416 returns the member 1302 to its resting state (e.g., extended position).

Figure 15:
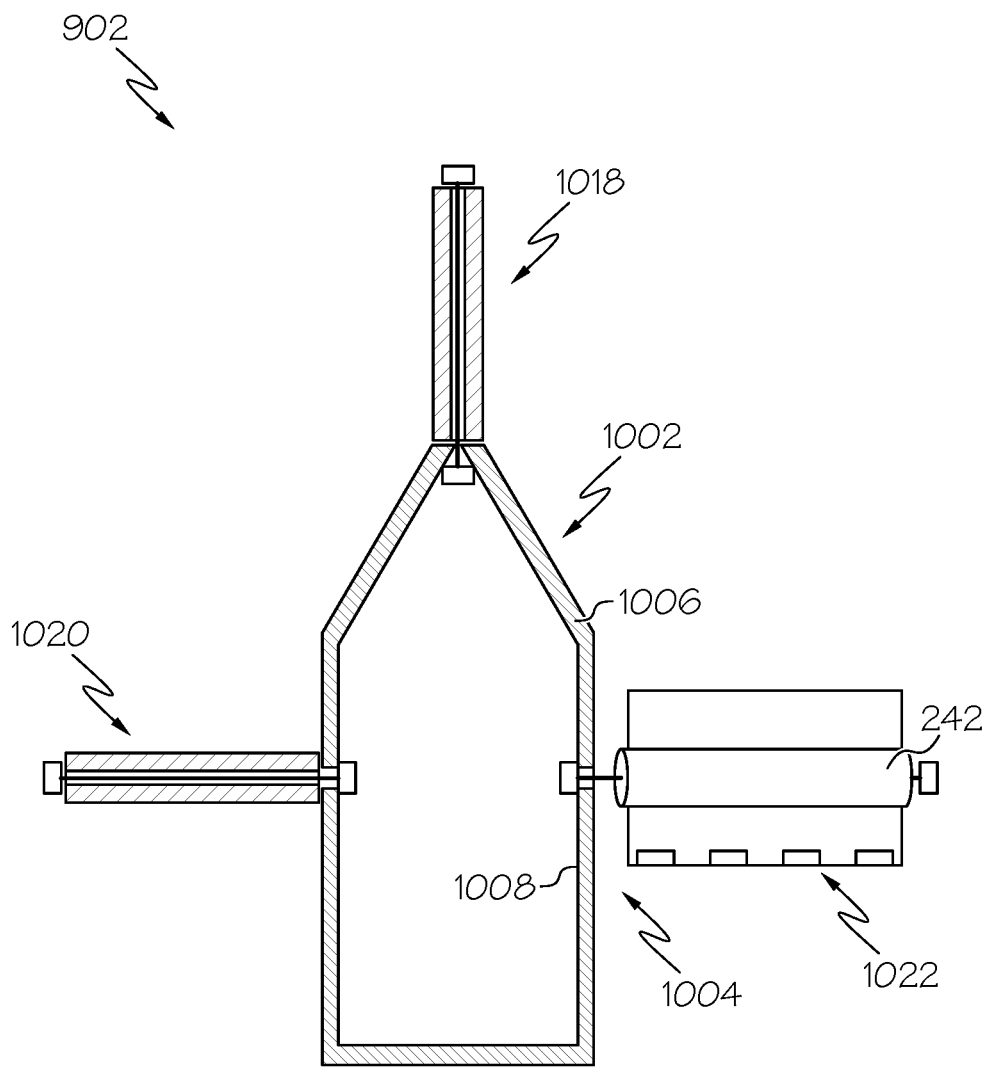
FIG. 15 is a side view of the second avian streamer/perching deterrent comprising one or more members extending from the housing upon which the first avian streamer deterrent is disposed according to one embodiment of the present invention.

In another embodiment, the streamer deterrent 242 (or similar component) discussed with respect to FIGS. 2 to 8A is disposed on the portion of the body of the member 1024 extending from the outer wall 1006 of the deterrent 902 as shown in FIG. 15. In this embodiment, instead of being disposed on a top wire such as the overhead ground wire 216 the streamer deterrent 242 discussed with respect to FIGS. 2 to 8A is disposed on the member 1024 and rotates about the member 1024. In this embodiment, the member 1024 may be elastic or rigid/semi-rigid. In addition, two or more of the deterrent components 1018 to 1022 may comprise a different one of the configurations discussed above with respect to FIGS. 9 to 15. For example, one or more of the deterrent components 1018 to 1022 may comprise the configuration discussed above with respect to FIGS. 10 and 11 while one or more of the deterrent components 1018 to 1022 may comprise the streamer deterrent 242 discussed with respect to FIGS. 2 to 8A.

Figure 16:
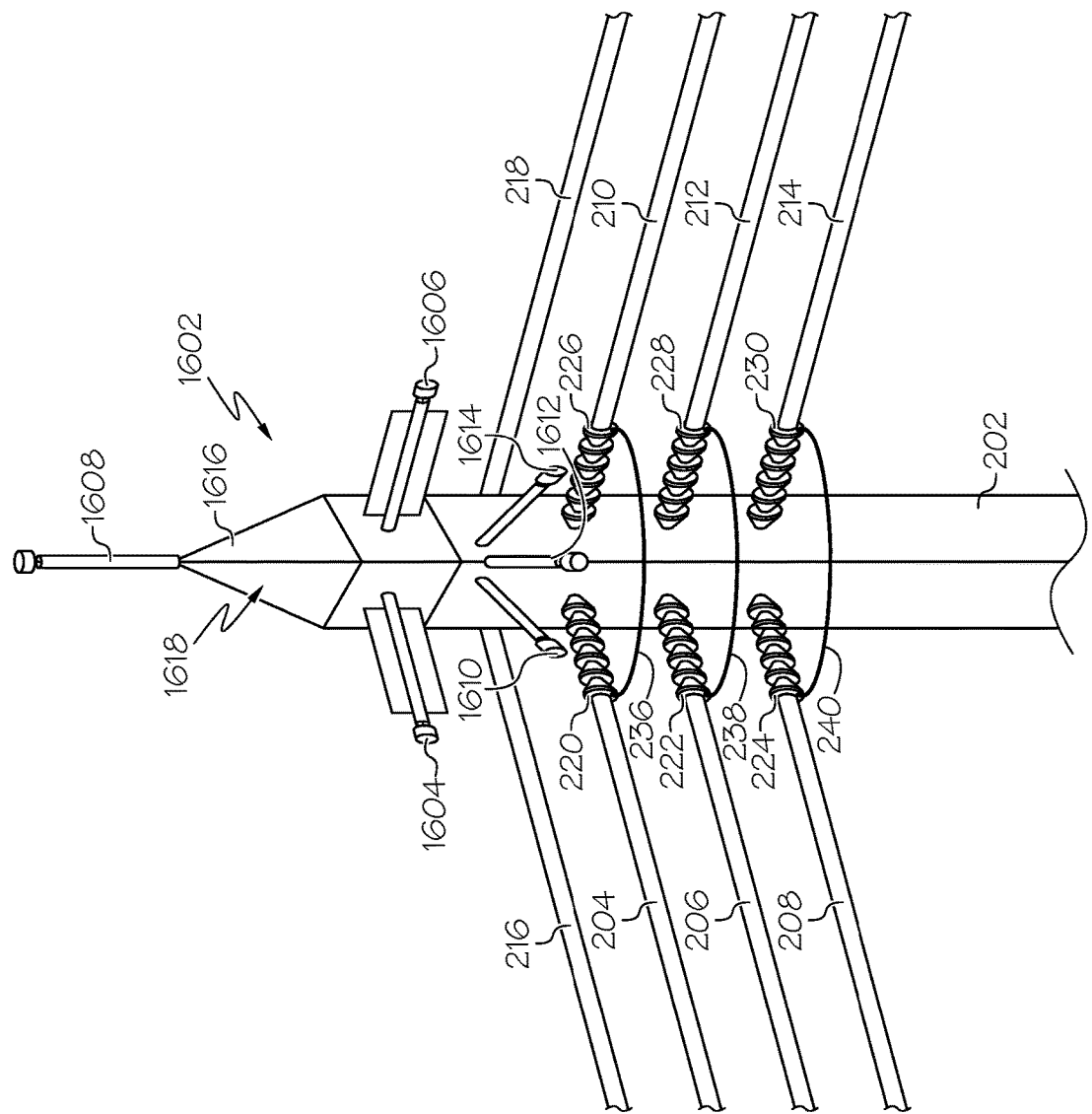
FIG. 16 is another illustrative example of the electric power line support structure and its various components including a different configuration of the second avian streamer/perching deterrent according to one embodiment of the present invention.

FIG. 16 shows another example of a deterrent system 1602 being disposed on the power line supporting structure 202. In this example, the system 1602 comprises a first set of streamer deterrents similar to that discussed above with respect to FIGS. 2 to 8B and a second set of streamer deterrents similar to those discussed above with respect to FIGS. 9 to 15. In one embodiment, the first set of streamer deterrents comprise one or more rotatable streamer deterrents 1604, 1606 disposed above and over underlying insulators 220 to 230 coupled to power conducting lines 208 to 218. The second set of streamer deterrents, in one embodiment, comprise one or more collapsible members 1608 to 1614 extending from a housing 1616 disposed on a top portion of the power line support structure 202. At least one of the collapsible members 1608 may be disposed on a top portion 1618 of the housing, while one or more collapsible members 1610 to 1614 may be extend from one or more sides of the housing 1616. These collapsible members 1610 to 1614, in one embodiment, extend above and over the jumpers 236 to 240 coupling power conducting lines 208 to 218 to each other. It should be noted that embodiments of the present invention are not limited to the example shown in FIG. 16. For example, the one or more rotatable streamer deterrents 1604, 1606 may be disposed above over the jumpers 236 to 240 while the collapsible members 1610 to 1614 may be disposed above and over the insulators 220 to 230.

The embodiments discussed above are advantageous over conventional streamer deterrents since they discourage and prevent birds from perching over electric power conductors, insulators, jumpers, and/or other components that are sensitive to bird excrement. Unlike conventional pole top deterrents, the streamer deterrents of one or more embodiments discourage perching adjacent to the power line support structure. The streamer deterrents of one or more embodiments either rotates/spins or collapses thereby providing an unstable perching platform which persuades a bird to locate a different perching location.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An avian streamer deterrent system comprising:
an electric power line support structure coupled to a plurality of conducting wires, wherein each conducting wire of the plurality of conducting wires is coupled to an insulator; and
at least one avian streamer deterrent disposed above the insulator of at least one of the conducting wires of the plurality of conducting wires, the at least one avian streamer deterrent comprising two or more fins extending outward from and longitudinally across a hollow member, wherein the hollow member is configured to rotate about a wire in response to an avian presence on at least one of the two or more fins.

2. The avian streamer deterrent system of claim 1, wherein the at least one avian streamer deterrent is disposed on a wire disposed above the plurality of conducting wires.

3. The avian streamer deterrent system of claim 2, wherein the wire disposed above the plurality of conducting wires is not coupled to an insulator.

4. The avian streamer deterrent system of claim 1, wherein the at least one avian streamer deterrent is disposed above and extending over one or more jumpers coupling at least a first conducting wire of the plurality of conducting wires to a second conducting wire of the plurality of conducting wires.

5. The avian streamer deterrent system of claim 1, wherein the plurality of conducting wires are vertically aligned with respect to each other.

6. The avian streamer deterrent system of claim 1, wherein the hollow member comprises an inner wall defining a cavity, wherein the cavity is configured to receive the wire, and wherein the wire is disposed above the plurality of conducting wires.

7. The avian streamer deterrent system of claim 6, wherein the hollow member comprises a helical configuration.

8. An avian streamer deterrent comprising:
a hollow member comprising an inner wall defining a cavity configured to receive a wire coupled to an electric power line support structure and disposed above at least one insulator of a conducting wire, the hollow member further comprising a helical configuration such that a first end of the hollow member curves towards the cavity and a second end of the hollow member curves towards an outer wall of the first end; and
two or more fins extending outward from and longitudinally across the hollow member.

9. The avian streamer deterrent of claim 8, wherein the hollow member is configured to rotate about the wire disposed above at least one insulator of a conducting wire.

10. The avian streamer deterrent of claim 8, where at least one of the two or more fins comprises one or more weights disposed across an outer edge of the at least one of the two or more fins.

11. An avian streamer deterrent system comprising:
an electric power line support structure coupled to a plurality of conducting wires, wherein each conducting wire of the plurality of conducting wires is coupled to an insulator; and
at least one avian streamer deterrent disposed above the insulator of at least one of the conducting wires of the plurality of conducting wires and further disposed on a wire situated above the plurality of conducting wires, the at least one avian stream deterrent comprising a hollow member that includes a helical configuration configured to receive the wire.

12. The avian streamer deterrent system of claim 11, wherein the wire situated above the plurality of conducting wires is not coupled to an insulator.

13. The avian streamer deterrent system of claim 11, wherein the at least one avian streamer deterrent is disposed above and extending over one or more jumpers coupling at least a first conducting wire of the plurality of conducting wires to a second conducting wire of the plurality of conducting wires.

14. The avian streamer deterrent system of claim 11, wherein the plurality of conducting wires are vertically aligned with respect to each other.

* * * * *